Jan. 15, 1957
H. A. PURSCHE
2,777,373
TWO-WAY ROLL-OVER DISC PLOW
Filed Oct. 31, 1952
5 Sheets-Sheet 1
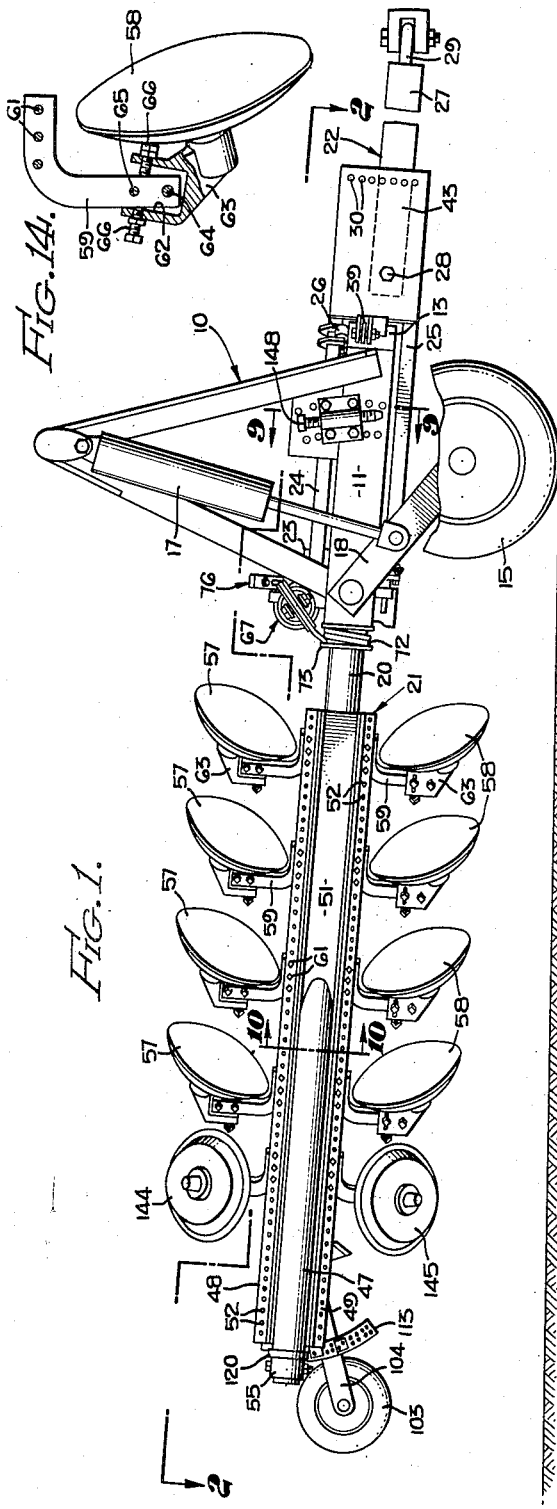
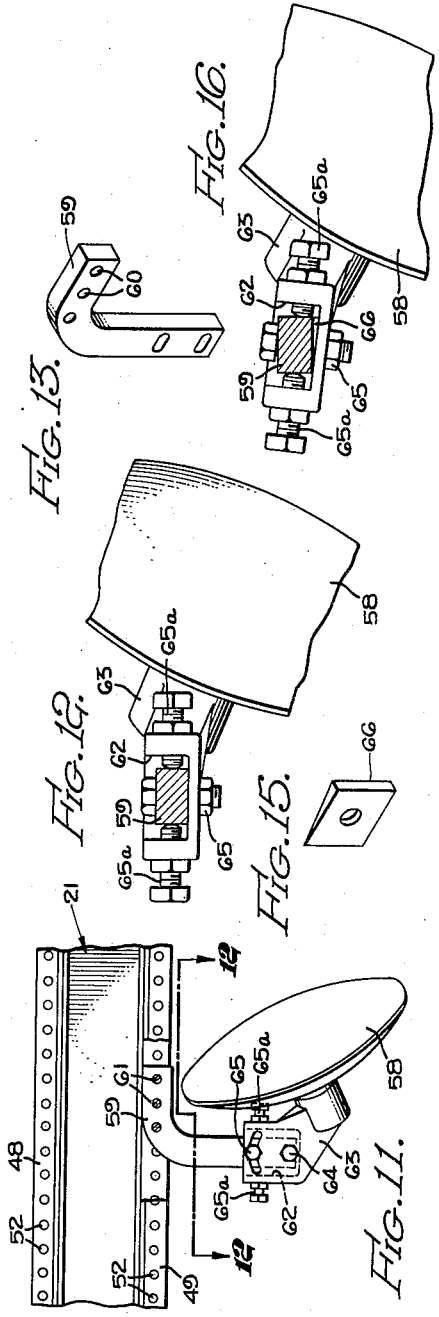
INVENTOR.
HARRY A. PURSCHE
BY Lyon+Lyon
ATTORNEYS

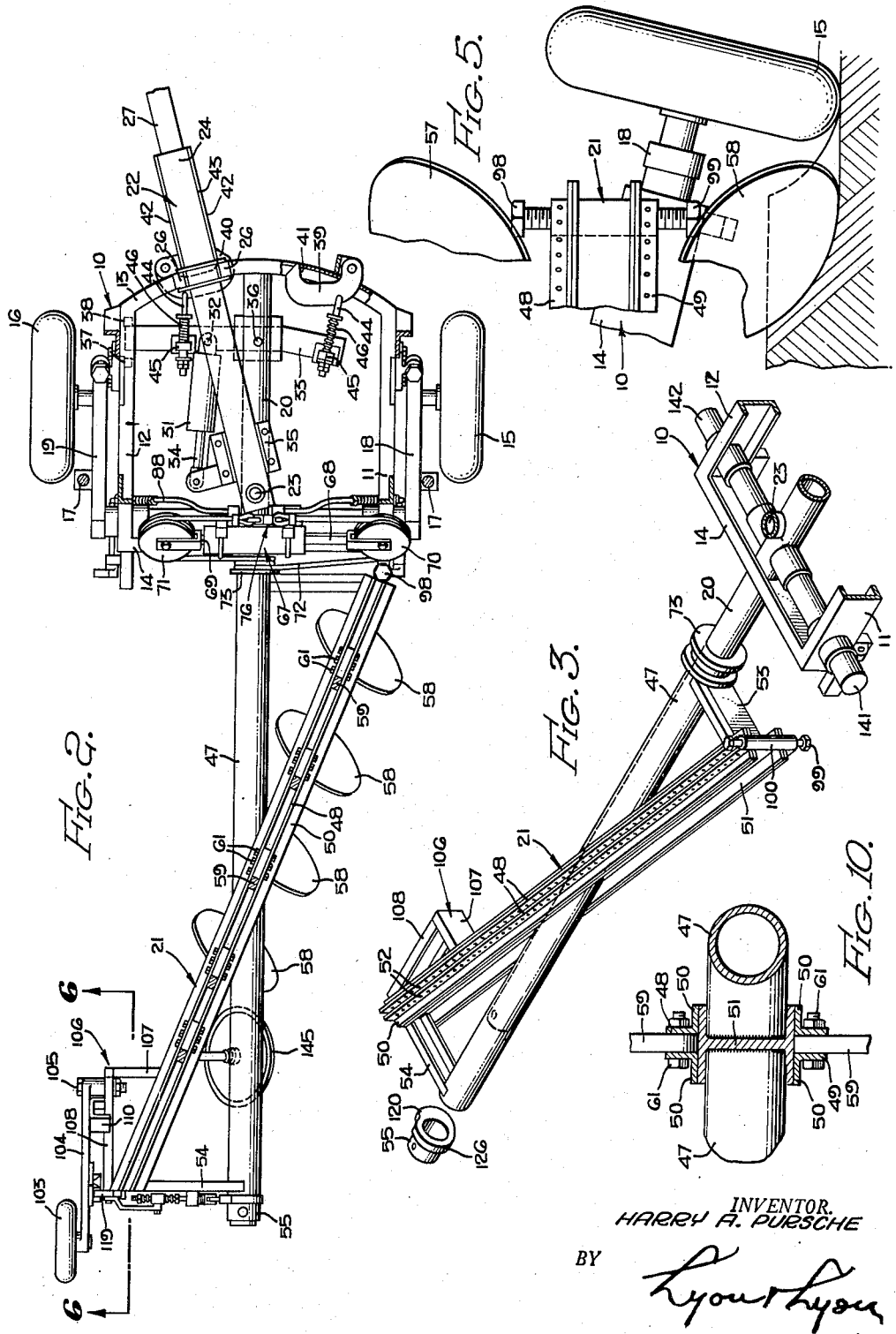

Jan. 15, 1957 H. A. PURSCHE 2,777,373
TWO-WAY ROLL-OVER DISC PLOW
Filed Oct. 31, 1952 5 Sheets-Sheet 3
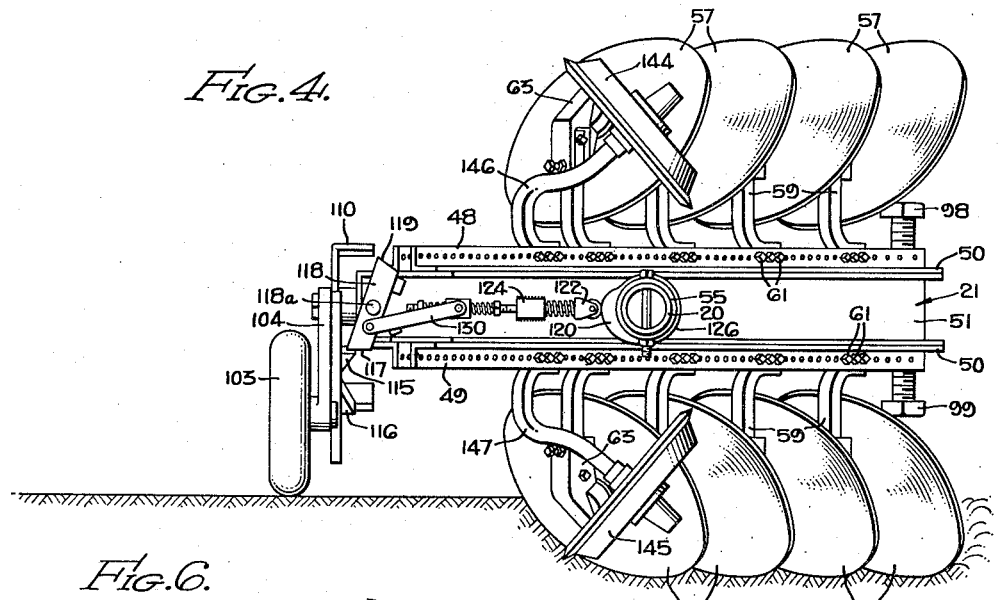
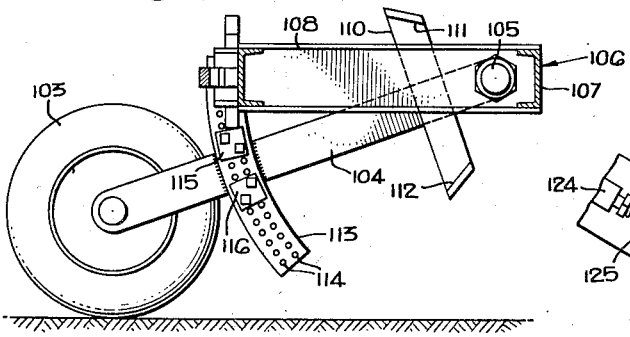
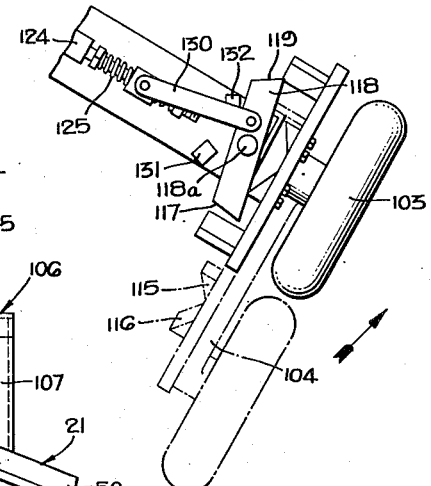
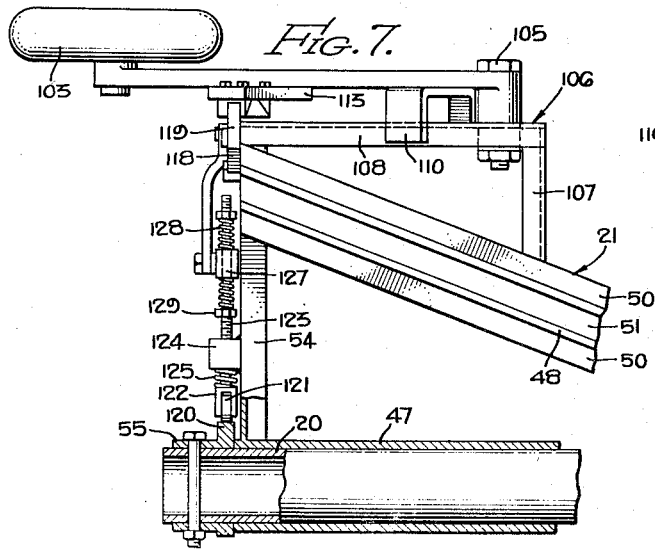
INVENTOR.
HARRY A. PURSCHE
BY
*Lyon & Lyon*
ATTORNEYS

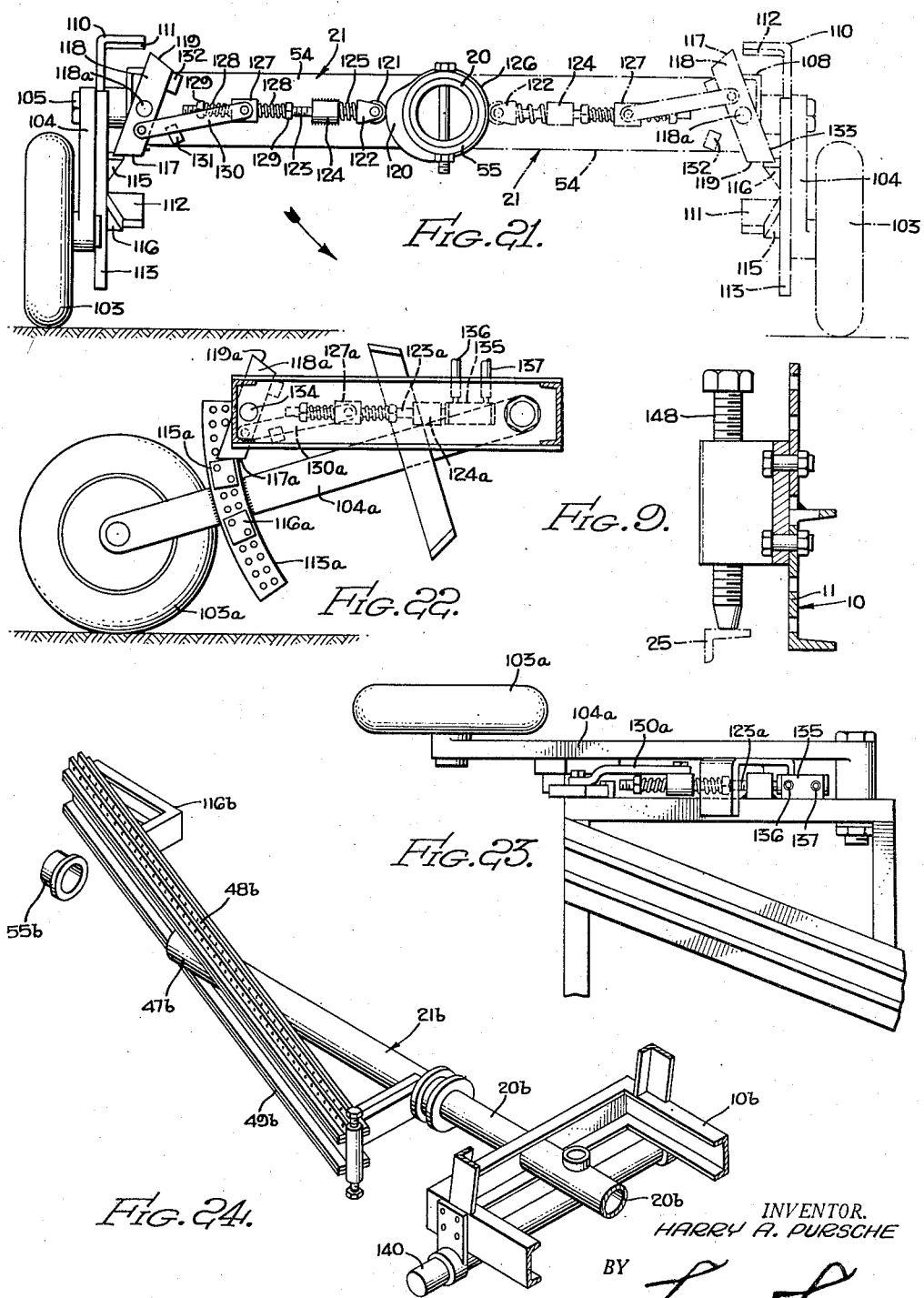

Jan. 15, 1957 H. A. PURSCHE 2,777,373
TWO-WAY ROLL-OVER DISC PLOW
Filed Oct. 31, 1952 5 Sheets-Sheet 5

INVENTOR.
HARRY A. PURSCHE
BY Lyon & Lyon
ATTORNEYS

United States Patent Office 2,777,373
Patented Jan. 15, 1957

2,777,373

TWO-WAY ROLL-OVER DISC PLOW

Harry A. Pursche, Gardena, Calif.

Application October 31, 1952, Serial No. 318,051

9 Claims. (Cl. 97—26)

This invention relates to agricultural implements and is particularly directed to improvements in a two-way disc plow. My invention will be described in connection with a two-way disc plow having a roll-over carrier mounted to turn about an axis extending longitudinally to the direction of travel of the plow.

Two-way plows are capable of throwing a furrow either to the left or to the right as desired and therefore they are used extensively on land which must be kept level or nearly level for irrigation purposes, as well as on hilly land where contour plowing is preferable. Disc plows have certain advantages over moldboard plows as will be understood by those skilled in the art. Among these is the characteristic advantage that the disc plow requires less draw-bar horsepower to operate it.

Two-way disc plows however have not met wtih universal acceptance and this is at least partly due to the construction heretofore adopted in which the individual discs each function both as a right-hand plow and a left-hand plow. In such devices the discs are mounted on a beam which swings from side to side. In one position of the beam the plow discs produce a right-hand furrow and in the other position of the beam the same discs produce a left-hand furrow. Two-way disc plow devices of this type are relatively inflexible because they cannot readily be adjusted for a wide range of depth of furrow as well as a wide range effective plowing width.

In accordance with my invention I provide a plow carrier which is mounted to turn about a longitudinal axis and on this carrier I position a plurality of discs for right-hand use and a plurality of discs for left-hand use. The number of discs employed may be varied. The effective width to be plowed may be varied by changing the number of discs and by adjusting the position of each of the discs along the length of the carrier. The depth of cut and the angularity of the individual discs may be regulated as desired. Furthermore I provide means for absorbing the lateral side thrust which is characteristically developed by disc plows, and the side thrust absorbing elements are also adjustably mounted on the plow carrier. I prefer to provide separate means for regulating the depth of cut and this means takes the form of a novel tail wheel assembly mounted to roll on unplowed ground. Other and more detailed objects and advantages will appear hereinafter.

Referring to the drawings:

Figure 1 is a side elevation partly broken away showing in idealized form a preferred embodiment of my invention.

Figure 2 is a plan view taken substantially on the lines 2—2 as shown in Figure 1.

Figure 3 is a perspective view showing details of construction of the roll-over carrier.

Figure 4 is a rear elevation showing the discs in operative position for producing a right-hand furrow.

Figure 5 is a fragmentary rear elevation showing one of the supporting wheels rolling in the furrow and showing the horizontal position of the plow carrier.

Figure 6 is a sectional elevation taken substantially on the lines 6—6 as shown in Figure 2.

Figure 7 is a sectional plan view partly broken away showing the left-hand portion of Figure 2 on an enlarged scale.

Figure 8 is a fragmental detail showing an end view of the device and illustrating a portion of the tail wheel assembly in a different position than that of Figure 4.

Figure 9 is a sectional detail taken substantially on the lines 9—9 as shown in Figure 1.

Figure 10 is a sectional elevation taken substantially on the lines 10—10 as shown in Figure 1 looking along the beam 51, and showing details of the construction of the carrier.

Figure 11 is a fragmentary detail showing the mounting and adjustment of one of the plow discs relative to the carrier.

Figure 12 is a sectional plan view partly broken away taken substantially on the lines 12—12 as shown in Figure 11.

Figure 13 is a perspective view showing the construction of one of the plow beams.

Figure 14 is a detail partly in section showing the connection between the plow beam and the bearing housing for one of the plow discs.

Figure 15 is a perspective view showing one of the wedges which may be employed to cant the disc bearing housing with respect to the plow beam.

Figure 16 is a view similar to Figure 12 showing the use of the wedge.

Figure 18:
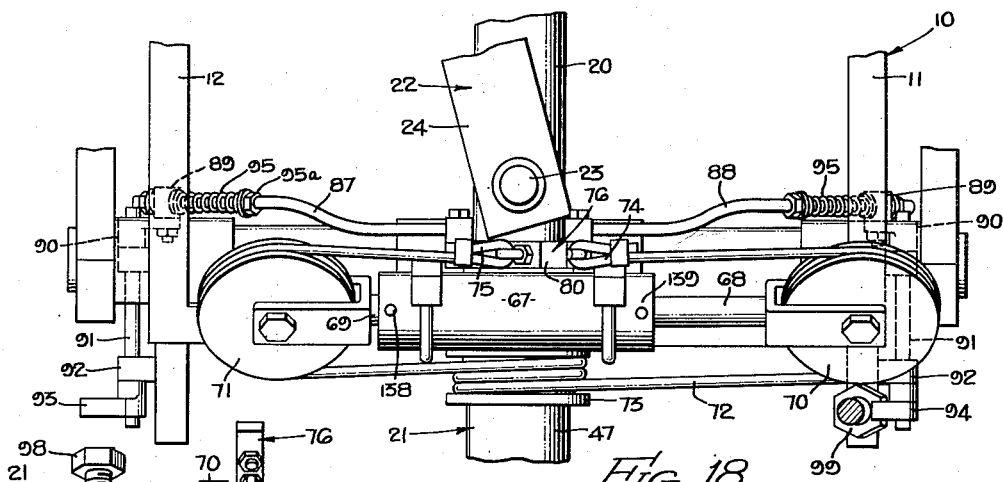
Figure 19:
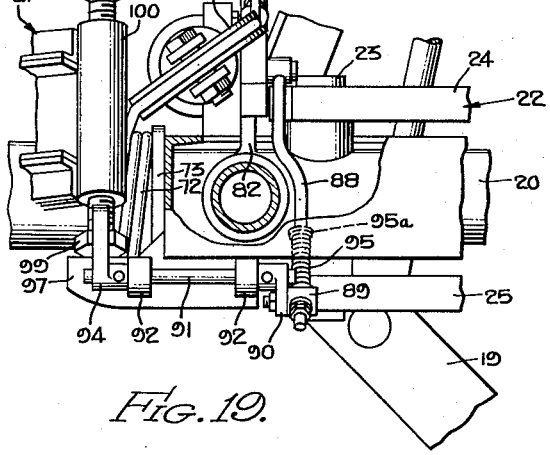
Figure 20:
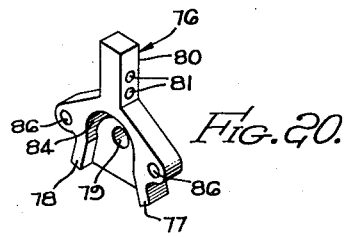

Figure 18 is a plan view partly broken away showing the mechanism for rolling the carrier and for latching it in place. Figure 19 is a fragmentary detail partly in section showing the latch mechanism for the carrier. Figure 20 is a perspective view of the latch-operating fitting. Figure 21 is an end view showing details of operation of the tail wheel assembly. Figure 22 is a view similar to Figure 6 showing a modified form of tail wheel assembly. Figure 23 is a plan view of the device shown in Figure 22. Figure 24 is a view similar to Figure 3 showing a modified form of frame and carrier.

Referring to the drawings:

The mobile frame generally designated 10 includes parallel side members 11 and 12 joined by a curved front member 13 and a straight rear member 14. The frame 10 may be raised and lowered relative to the ground wheels 15 and 16 by means of hydraulic power cylinder assemblies 17, acting on the wheel arms 18 and 19. The frame 10 includes a stationary longitudinal beam 20 which extends centrally of the frame between the side members 11 and 12 and which is fixed to the front and rear members 13 and 14. This longitudinal beam 20 projects rearwardly from the frame 10 to provide a support for the plow carrier 21.

A tongue member 22 is pivoted to the beam 20 at 23. This tongue member is bifurcated, with the upper leg 24 and lower leg 25 straddling the curved front member 13 and the beam 20. Rollers 26 may be provided to permit the tongue member 22 to roll on the curved front member 13. The tongue member 22 includes the draft part 27 which is pivoted at 28 and provided with a draft coupling 29 at its forward end. The extent of pivotal movement of the draft part 27 may be limited by means of pins projected through aligned openings 30.

Means are provided for shifting and latching the tongue member 22 and as shown in the drawings this means includes the hydraulic cylinder assembly 31 pivotally connected at 32 to the crossbar 33. The piston rod 34 is connected to the bracket 35 fixed on the lower leg 25 of the tongue member 22. The crossbar 33 is itself pivoted to the beam 20 at 36 and the extent of its pivotal movement is limited by the stops 37 and 38 on the frame side member 12. When the hydraulic cylinder assembly 31 is energized to retract the piston rod 34, the tongue member 22 is shifted in a clockwise direction about its pivot 23, as viewed in Figure 2. Similarly, the tongue member is swung in the other direction when the cylinder assembly 31 projects the piston rod 34.

Movement of the crossbar 33 is utilized to actuate the tongue latches 39 and 40. Each of these latches is pivoted on the curved member 13 of the frame and is adapted to latch the tongue member 22 in one of its two operative positions. Thus, the shoulder 41 engages one side surface 42 of the tongue member 22 and the corresponding shoulder on latch 40 engages the other side surface 42 thereof. Actuating rods 44 are pivoted to the latches 39 and 40, respectively, and pass loosely through blocks 45 pivoted to the crossbar 33. Compression springs 46 encircling the rods 44 tend to swing the latches toward operative position, whereas the rods serve to retract the latches against the action of the springs. The latches 39 and 40 relieve the hydraulic cylinder assembly 31 of the requirement of holding the tongue member 22 in either of its operative positions.

The carrier 21 includes a support pipe 47 mounted to turn on the overhanging portion of the longitudinal beam 20. The support pipe 47 extends between the parallel tracks 48 and 49 which are mounted at an angle to the pipe 47. Each of these tracks is formed by a pair of angle irons 50 fixed, as by welding, to the flanges of the central I beam support 51. The parallel parts of each pair of angle irons 50 define the track between them, and these parallel parts are provided with a series of aligned, closely spaced apertures 52. The pipe 47 extends through the I beam support 51 at an angle, and the adjacent parts at the intersection are welded together. A front strut 53 and a rear strut 54 connect the ends of the I beam to the pipe 47 to provide a rigid structure. A thrust collar 55 is removably fixed to the rearward end of the longitudinal beam 20 and engages a thrust surface on the rear end of the pipe 47 to apply the draft force to the carrier 21.

A first gang of plow discs 57 is carried by the track 48 and a second gang of plow discs 58 is carried by the track 49. A support beam 59 is provided for each disc. Each support beam is generally L-shaped and the horizontal portion is provided with a plurality of apertures 60 having the same spacing as the track apertures 52. Each support beam 59 may be moved to any desired position along its respective track, and then secured in place by fastening elements 61 extending through aligned apertures 52 and 60. The vertical portion of each support beam 59 is received within a socket 62 on a bearing housing 63. Each disc is rotatably supported on one of these bearing housings. Angular adjustment in one plane between each support beam 59 and its respective bearing housing 63 is provided by the pivot bolt 64, clamp bolt 65 and set screws 65a, and angular adjustment in another plane is provided by the apertured wedges 66. The wedges 66 may be mounted within the sockets 62 to cant the bearing housing 63 and disc in either direction, as desired.

Means are provided for turning the carrier 21 relative to the frame 10 to bring either gang of discs into plowing position. As shown in the drawings this means includes a double-acting hydraulic cylinder assembly 67 having piston rods 68 and 69 projecting from opposite ends thereof and carrying sheaves 70 and 71, respectively. A cable 72 has a plurality of loops encircling the drum 73 which is fixed on the forward end of the carrier pipe 47. The cable passes over the sheaves 70 and 71 and its two ends 74 and 75 are fixed to the rocking anchor part 76. This part 76 is supported on the frame 10 and as shown in Figure 20 is provided with a pair of legs 77 and 78 and a central pivot hole 79. An upstanding post 80 has holes 81 affording connection for the fittings at the ends 74 and 75 of the cable 72. An upstanding stationary bracket 82 on the frame cross member 14 is rounded at its upper end 83 for reception within the recess 84 in the rocking anchor part 76. A pin 85 passes through the bracket 82 and pivot hole 79 to prevent separation of the parts. The legs 77 and 78 engage the sides of the bracket 82 to limit rocking movement of the element 76 in each direction.

The rocking anchor part 76 is provided with apertured lugs 86 which afford a pivotal connection with the rods 87 and 88. The lower end of each push rod passes loosely through an opening in a block 89 pivotally attached to a crank arm 90. Each crank arm 90 is fixed to a rock shaft 91 supported in spaced bearings 92. Latches 93 and 94 are fixed to their respective shafts 91. A compression spring 95 encircles a portion of each rod and is confined between a stop collar 95a and one of the blocks 89. A second stop collar engages the block 89 directly.

Stationary abutments 96 and 97 are fixed on the frame 10 and are adapted to be engaged by the stop elements 98 and 99 mounted on the carrier 21 at the forward end of the parallel tracks 48 and 49. These stop elements may conveniently take the form of bolts threaded into opposite ends of an internally threaded boss 100. The bolt head of the stop element 99 engages the stationary abutment 97 and is held in this position by the latch 94. Similarly, the bolt head of the stop element 98 engages the stationary abutment 96 and is held in this position by the latch 93.

Figure 17:
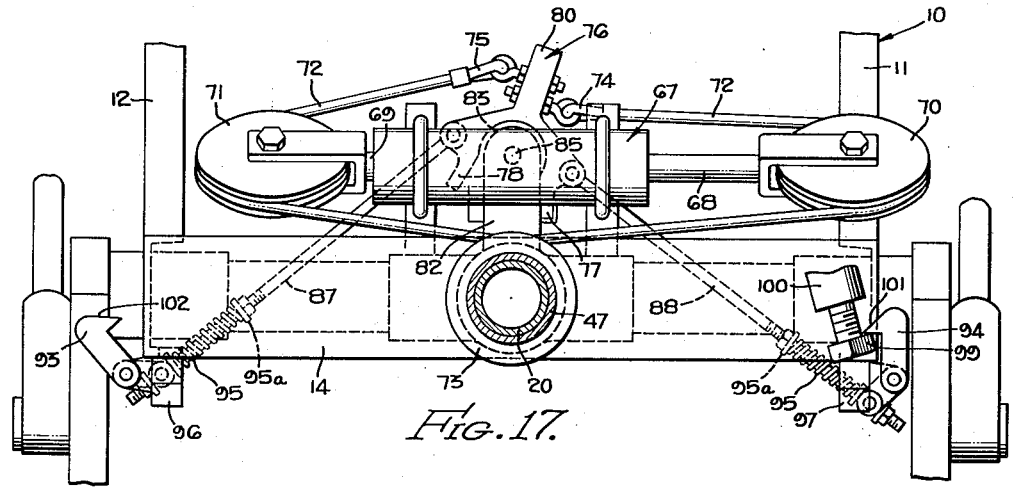
Figure 17 is a rear elevation partly broken away showing the mechanism for rolling the plow carrier relative to the stationary longitudinal beam as well as details of the mechanism for latching the carrier in either of its operative positions.

When the hydraulic cylinder assembly 67 is energized to project the piston rod 68 and retract the piston rod 69, the cable 72 is tensioned to turn the drum 73 in a direction to bring the stop 99 against the abutment 97. The tension in the end 74 of the cable 72 causes the element 76 to rock to the position shown in Figure 17, thereby tensioning the rod 87 and moving the latch 93 to released position, permitting the carrier to turn. As the stop 99 approaches the abutment 97 it strikes the tapered surface 101 on the nose of the latch 94, causing the latch 94, rock shaft 91 and crank arm 90 to move the block 89 against the action of the compression spring 95 on rod 88. The spring then returns the latch 94 to operative position. Similarly, when the hydraulic cylinder assembly 67 is energized to project the piston rod 69 and retract the piston rod 68, the cable 72 is tensioned to turn the drum 73 in a direction to bring the stop 98 against the abutment 96. The tension in the end 75 of the cable causes the element 76 to shift away from the position shown in Figure 17, thereby tensioning the rod 88 to move the latch 94 to released position, permitting the carrier to turn. Engagement of the stop 98 with the tapered surface 102 swings the latch 93 momentarily against the action of the spring 95 on rod 87 to allow the stop 98 to reach the abutment 96. The latch 93 is returned to latching position by the action of the spring 95 on rod 87.

It will be observed that the carrier 21 turns somewhat less than one-half revolution because the frame 10 tilts as the wheels 15 and 16 alternately roll in the furrow. (See Figure 5.) The carrier tracks 48 and 49 remain horizontal, however, so that all of the plow discs in each gang cut to the same depth.

I prefer to provide a third supporting wheel 103 which is mounted on the carrier 21 and which rolls on unplowed ground. The plow assembly is thus provided with three-point suspension and hence is not affected by relative vertical movement of the tractor as it moves over uneven ground. This third wheel 103 is carried at the swinging end of an arm 104. A pivot bolt 105 connects the arm 104 to the support bracket 106 fixed to the rearward portion of the carrier I beam 51. As shown in Figure 7, the bracket 106 is made up of a short part 107 and a long part 108 welded to the I-beam 51. A stop element 110 is fixed to the arm 104 and is provided with stop shoulders 111 and 112. These shoulders 111 and 112 prevent over-travel of the arm 104 with respect to the bracket 106 by engagement with the part 108.

An arcuate segment 113 is fixed to the arm 104 and is provided with a series of apertures 114 which may be utilized for bolting the blocks 115 and 116 to the segment 113. The block 115 provides an abutment for engagement with the end surface 117 on the pivoted stop lug 118. Similarly, the block 116 provides an abutment for engagement with the end surface 119, of the stop lug 118. The stop lug 118 is supported on a pivot pin 118a mounted on the carrier 21 near the juncture of the I beam 51 and the part 108 of the bracket 106. Means are provided for shifting the position of the stop lug 118 in accordance with the position of the carrier 21 so that the stop lug 118 will engage the uppermost of the blocks 115 and 116. As shown in Figure 4 and the full lines in Figure 21 the end surface 117 of the stop lug 118 engages the block 115 when the carrier 21 is in position to produce a right-hand furrow. When the carrier 21 is shifted to the dashed line position shown in Figure 21 the end surface 119 of the stop lug 118 engages the block 116. In each case the stop lug 118 engages the uppermost of the blocks 115 and 116. The purpose of this arrangement is to permit the use of a smaller diameter tail wheel 103 than would otherwise be possible, and yet provide a full range of adjustment for the depth of cut of the discs.

The thrust carrier 55 at the rear end of the longitudinal beam 20 is provided with a protuberance 120 at one side for engagement with the follower roller 121. This roller 121 is supported on a clevis 122 fixed on the end of a slide rod 123. This rod 123 passes through a guide sleeve 124 fixed to the strut 54. A compression spring 125 is interposed between this sleeve 124 and the clevis 122 in order to maintain the roller 121 in contact with the protuberance 120 or outer cylindrical surface 126 of the thrust collar 55. A block 127 is slidably mounted on the rod 123 and confined between compression springs 128 and nuts 129 which serve as abutments. The springs 128 tend to keep the block 127 centered between the abutments 129. A link 130 is pivotally connected at one end to the stop lug 118 and at the other end to the block 127. When the carrier 21 and strut 54 turn in a counterclockwise direction as viewed in Figure 21, the roller 121 rides down the protuberance 120 and engages the cylindrical surface 126. The rod 123 moves radially inwardly between the longitudinal beam 20 and this action causes the link 130 to shift the position of the stop lug 118 about its pivotal support 118a. The stop lug 118 then assumes the position shown in the dashed lines in Figure 21. Bumper blocks 131 and 132 may be mounted on the strut 54 to limit the extent of pivotal movement of stop lug 118.

The frame 10 of beam 20 and carrier 21 are raised to bring the plow discs out of the ground and the carrier 21 is subsequently turned in the direction of the arrows shown in Figure 21. The tail wheel 103 rests on the ground until the part 108 of the bracket 106 engages under the shoulder 111 and the tail wheel 103 is lifted clear of the ground. When the carrier 21 is turned about the beam 20, the tail wheel 103 swings under the beam 20, just clearing the ground. As the strut 54 approaches the dashed line position shown in Figure 21 the arm 104 and wheel 103 drop by gravity and the blocks 115 and 116 ratchet past the inclined surface 133 of the stop lug 118. The spring mounting of the slide block 127 permits the stop lug 118 to swing about its pivotal support to permit the blocks 115 and 116 to pass by. The stop shoulder 112 may engage the part 108 to limit downward movement of the arm 104 and wheel 103. When the strut 54 reaches the horizontal position shown in dashed lines in Figure 21, the wheel 103 rests on the ground and the shoulders 111 and 112 have clearance in respect to the part 108. The surface 119 of the stop lug 118 engages the abutment on the block 116 to hold the tail wheel assembly in position.

Similarly, when the carrier 21 is to be turned in a clockwise direction as viewed in Figure 21, the beam 20 and carrier 21 are first raised to lift the plow discs clear of the ground, thereby causing the shoulder 112 to engage the part 108 and raise the tail wheel 103 as the carrier turns. The strut 54 then swings downwardly about the axis of the pipe 20, the strut 54 approaches the full-line position shown in Figure 21, and the roller 122 rides up on the protuberance 120 and swings the pivoted stop lug 118 to the position shown in full lines with respect to the strut 54. The arm 104 and wheel 103 descend by gravity and the blocks 115 and 116 slide past the inclined surface 133 on the stop lug 118. The sliding block 127 permits the stop lug 118 to swing about its support 118a sufficiently to allow the blocks 115 and 116 to pass. The clockwise motion of the carrier 21 and strut 54 ceases when the surface 117 of the stop lug 118 engages the abutment provided by the block 115.

Means are provided for absorbing the lateral thrust of the plow discs. This means comprises the furrow wheels 144 and 145 which are tilted to an angle well suited to prevent side movement in the furrow. Each furrow wheel is rotatably mounted at the end of a preformed support shank 146, 147. The shanks are received within the tracks 48 and 49 and are adjustably fixed along the length thereof. The shanks 146 and 147 are attached to the tracks 48, 49 in a position to place the furrow wheel in the proper location behind the last plow disc 57, 58 in the gang.

While I have shown four plow discs in each gang it will be understood that a greater or lesser number can be employed. The tracks 48 and 49 permit the discs and furrow wheels to be varied in number and in spacing.

In the modified form of my invention shown in Figures 22 and 23, I provide hydraulically actuated mechanism for swinging the stop lug 118a about its pivotal support 134. The arm 104a, segment 113a and tail wheel 103a are substantially the same as previously described. The slide rod 123a passes through the guide sleeve 124a and is connected for actuation by the double-acting power cylinder assembly 135. The slide block 127a and link 130a function in substantially the same manner as described above. When hydraulic fluid under pressure is admitted through line 136 and exhausted through line 137, the stop lug 118a is caused to swing from the position shown in Figure 22 to a position corresponding to the dashed line position shown in Figure 21. Conversely, when hydraulic fluid under pressure is admitted through line 137 and exhausted through line 136 the stop lug 118a is returned to the position shown in Figure 22. The end surfaces 117a and 119a of the stop lug 118a engage the abutments provided by the blocks 115a and 116a, respectively, as described above.

The hydraulic lines 136 and 137 may be interconnected with the hydraulic lines 138 and 139, respectively (see Figure 18) which serve the double-acting power cylinder assembly 67. Thus, when the power cylinder assembly 67 is actuated in a direction to turn the carrier to the position shown in Figure 4, the stop lug 118a is caused to shift to the position shown in Figure 22. Similarly, when the carrier 21 is shifted to a position to produce a left-hand furrow, the stop lug 118a is also shifted. The hydraulic lines 136 and 137 may conveniently be extended through the interior of the longitudinal member 20 and connected to the lines 138 and 139 at a position on the frame 10 in advance of the carrier 21, or, if desired, these hydraulic lines may be positioned between the flanges of the I-beam 51 and attached to the forward strut 53 on the carrier 21.

In the modified form of my invention shown in Figure 24, the longitudinal beam member 20b is shortened so that it projects rearwardly from the frame 10b for a distance equal to substantially half the length of the carrier 21b. Like Figure 3, Figure 24 shows the carrier 21b only partially installed on the beam 20b. Further telescopic movement of the carrier 21b toward frame 10b serves to cause a portion of the beam 20b to project beyond the rear end of the tube 47b. A thrust collar 55b which is substantially the same as that illustrated at 55 in Figure 21, but omitting protuberance 120, is then connected to the rear end of the beam 20b in position to contact the rear end of the tube 47b. The carrier rails 48b and 49b are substantially the same as previously described. The bracket 116b on the rear projecting end of the carrier 21b supports a tail wheel assembly, not shown. The tail wheel assembly is preferably of the hydraulically actuated type shown in Figures 22 and 23. The frame 10b differs from the frame 10 previously described in that the arms for the side supporting wheels are both fixed to a single cross shaft 140 instead of being independently mounted on separate shafts 141 and 142 as shown in Figure 3. The wheel arms are actuated in the same manner previously described but the wheels move up and down together with respect to the frame 10 instead of being capable of independent movement. It will be apparent that the carrier 21 can be telescopically removed from the longitudinal beam member 20 upon disconnection of the thrust collar. Other earth-working tools may then be mounted on the rearwardly projecting portion of the beam 20b and held in place by the thrust collar.

In operation, the plow device is towed to the field with the carrier 21 in raised position. The carrier is lowered to bring one of the plow gangs into plowing position. The depth of cut is controlled by the setting of the tail wheel stops 115 and 116 and the adjusting screws 148 which engage the wheel arms 18 and 19. The tongue member 22 is shifted to position the plow device in proper lateral position behind the tractor. At the end of the furrow the lift cylinders 17 are actuated to raise the frame 10 and carrier 21. The tractor and plow are then turned around at the end of the field, and during this movement the tongue is shifted and the carrier 21 is turned over to bring the other plow gang into position. Hydraulic pressure in the lift cylinders 17 is then relaxed to allow the plow discs to enter the ground. The ground wheels 15 and 16 roll alternately in the furrow, while the third wheel 103 always rolls on unplowed ground.

Having fully described my invention, it is to be understood that I do not wish to be limited to the details herein set forth, but my invention is of the full scope of the appended claims.

I claim:

1. In a two-way plow assembly, the combination of: a frame, a carrier turnably mounted on the frame and provided with ground-engaging plow means for producing a right-hand furrow or a left-hand furrow, means on the frame whereby it may be raised to lift the carrier and plow means clear of the ground, independent means for turning the carrier to either of two operative positions relative to the frame to cause the plow means to produce a right-hand furrow or a left-hand furrow as desired, said means including a flexible tension element operatively connected to turn the carrier, a part movably mounted on the frame and having at least one end of the flexible tension element secured relative thereto, power means for shifting the flexible tension element to turn the carrier, latch means on the frame engageable with an element on the carrier for latching the carrier in at least one of its operative positions, and linkage means operatively connecting the latch means and said part whereby movement of said part under forces imparted by the end of the flexible tension element serves to actuate said latch means.

2. In a two-way plow assembly, the combination of: a frame, a carrier turnably mounted on the frame and provided with ground-engaging plow means for producing a right-hand furrow or a left-hand furrow, means on the frame whereby it may be raised to lift the carrier and plow means clear of the ground, independent means for turning the carrier to either of two operative positions relative to the frame to cause the plow means to produce a right-hand furrow or a left-hand furrow as desired, said means including a drum on the carrier, a cable reeved on the drum between the ends thereof, a part movably mounted on the frame and having the ends of the cable secured relative thereto, power means for shifting the cable to turn the drum and carrier, latch means on the frame engageable with an element on the carrier for latching the carrier in either of its operative positions, and linkage means operatively connecting the latch means and said part whereby movement of said part under forces imparted by the ends of the cable serves to actuate said latch means.

3. In a two-way plow assembly, the combination of: a frame, a stationary longitudinal beam fixed on the frame and extending rearwardly therefrom, a carrier turnably mounted on the beam and provided with ground-engaging plow means for producing a right-hand furrow or a left-hand furrow, means on the frame whereby it may be raised to lift the carrier and plow means clear of the ground, independent means for turning the carrier to either of two operative positions relative to the frame to cause the plow means to produce a right-hand furrow or a left-hand furrow as desired, said means including a drum on the carrier, a cable reeved on the drum between the ends thereof, a part movably mounted on the frame and having the ends of the cable secured relative thereto, power means for shifting the cable to turn the drum and carrier including a double ended hydraulic power cylinder having piston rods projecting from opposed ends thereof, a sheave on each piston rod engaging the cable, latch means on the frame engageable with an element on the carrier for latching the carrier in either of its operative positions, and linkage means operatively connecting said part to said latch means whereby movement of said part under forces imparted by the ends of the cable serves to actuate said latch means.

4. In a two-way plow assembly, the combination of: a frame, a longitudinal beam member on the frame projecting rearwardly therefrom, a carrier mounted for turning movement on said beam member, ground-engaging plow means on the carrier for producing either a right-hand furrow or a left-hand furrow, means whereby the carrier may be turned relative to the beam member to either of two operative positions to produce a right-hand furrow or a left-hand furrow as desired, a tail wheel assembly on the carrier including a wheel adapted to roll on unplowed ground in either operative position of the carrier, said assembly having cooperating parts limiting downward movement of the carrier relative to said wheel, said assembly also including means engaging an element on said beam member rearwardly of said carrier and actuated in accordance with the position of the carrier for moving one of said cooperating parts to an inoperative position.

5. In a two-way plow assembly, the combination of: a frame, a longitudinal beam member on the frame projecting rearwardly therefrom, a carrier mounted for turning movement on said beam member, ground-engaging plow means on the carrier for producing either a right-hand furrow or a left-hand furrow, means whereby the carrier may be turned relative to the beam member to either of two operative positions to produce a right-hand furrow or a left-hand furrow as desired, an arm pivoted on the carrier and carrying a wheel adapted to roll on unplowed ground in either operative position of the carrier, cooperating parts limiting downward movement of the carrier relative to said arm, and means engaging an element on said beam member rearwardly of said carrier and actuated in accordance with the position of the carrier for moving one of said cooperating parts to an inoperative position.

6. In a two-way plow assembly, the combination of: a frame, a longitudinal beam member on the frame projecting rearwardly therefrom, a carrier mounted for turning movement on said beam member, ground-engaging plow means on the carrier for producing either a right-hand furrow or a left-hand furrow, means whereby the carrier may be turned relative to the beam member to either of two operative positions to produce a right-hand furrow or a left-hand furrow as desired, an arm pivoted on the carrier, a wheel on the swinging end of the arm adapted to roll on unplowed ground in either operative position of the carrier, cooperating parts for maintaining the wheel axis below the pivotal axis of the arm, and means engaging an element on said beam member rearwardly of said carrier and actuated in accordance with the position of the carrier for moving one of said cooperating parts to an inoperative position.

7. In a two-way plow assembly, the combination of: a frame having supporting wheels at the sides thereof, a longitudinal beam member on the frame projecting rearwardly therefrom, a carrier mounted for turning movement on said beam member, ground-engaging plow means on the carrier for producing either a right-hand furrow or a left-hand furrow, means whereby the carrier may be turned relative to the beam member to either of two operative positions to produce a right-hand furrow or a left-hand furrow as desired, an arm pivoted on the carrier, a wheel on the swinging end of the arm, said wheel being adapted to roll on unplowed ground in either operative position of the carrier and to cooperate with the first said wheels for supporting the plow assembly, cooperating parts for maintaining the wheel axis below the pivotal axis of the arm, and means engaging an element on said beam member rearwardly of said carrier and actuated in accordance with the position of the carrier for moving one of said cooperating parts to an inoperative position.

8. In a two-way plow assembly, the combination of: a frame, a longitudinal beam member on the frame projecting rearwardly therefrom, a carrier turnably mounted on the projecting portion of the beam member, a thrust collar removably fixed on the rear end of the beam member and engaging the rear end of said carrier, ground-engaging means on the carrier for producing either a right-hand furrow or left-hand furrow, means whereby the carrier may be turned relative to the frame to either of two operative positions to produce a right-hand furrow or a left-hand furrow as desired, a tail wheel assembly mounted on the carrier, said assembly including a wheel movably mounted upon the carrier and adapted to roll on unplowed ground in either operative position of the carrier, cooperating parts limiting downward movement of the carrier relative to said wheel, and means including an element on the thrust collar for moving one of the cooperating parts to an inoperative position in accordance with the position of the carrier.

9. In a two-way plow assembly, the combination of: a frame, a carrier turnably mounted on the frame and having ground-engaging plow means for producing either a right-hand furrow or a left-hand furrow, an arm pivoted on the carrier, a wheel on the swinging end of the arm adapted to roll on unplowed ground, a pair of spaced abutments fixed relative to the arm, a stop lug pivotally mounted on the carrier and having opposed ends each engageable with one of said abutments, the abutments and stop lug cooperating to maintain the wheel axis below the pivotal axis of the arm, and means including an element fixed relative to the frame for shifting the position of the stop lug in accordance with turning movement of the carrier.

References Cited in the file of this patent

UNITED STATES PATENTS

| | | |
|---|---|---|
| 536,949 | Fay | Apr. 2, 1895 |
| 714,570 | Fowler et al. | Nov. 25, 1902 |
| 1,500,367 | Caughey | July 8, 1924 |
| 1,846,652 | Paul | Feb. 23, 1932 |
| 2,202,931 | Strandlund | June 4, 1940 |
| 2,208,526 | Gurries | July 16, 1940 |
| 2,573,969 | Heitzig | Nov. 6, 1951 |
| 2,591,711 | Moore | Apr. 8, 1952 |
| 2,625,089 | Pursche | Jan. 13, 1953 |
| 2,625,090 | Pursche | Jan. 13, 1953 |
| 2,625,091 | Pursche | Jan. 13, 1953 |
| 2,633,787 | Nelson | Apr. 7, 1953 |
| 2,655,851 | Pursche | Oct. 20, 1953 |
| 2,659,284 | Pursche | Nov. 17, 1953 |

FOREIGN PATENTS

| | | |
|---|---|---|
| 49,222 | Germany | of 1889 |

OTHER REFERENCES

The Nash Century Steering Engine, pub. 1909 by Century Eng. Co., Ogdensburg, N. Y. Pages 3 and 16. Copy in 114/150.